US008896361B2

(12) United States Patent
Broyde et al.

(10) Patent No.: US 8,896,361 B2
(45) Date of Patent: Nov. 25, 2014

(54) PSEUDO-DIFFERENTIAL RECEIVING CIRCUIT

(75) Inventors: Frederic Broyde, Maule (FR); Evelyne Clavelier, Maule (FR)

(73) Assignee: EXCEM, Maule (FR)

( * ) Notice: Subject to any disclaimer, the term of this patent is extended or adjusted under 35 U.S.C. 154(b) by 1006 days.

(21) Appl. No.: 12/960,832

(22) Filed: Dec. 6, 2010

(65) Prior Publication Data

US 2011/0074488 A1    Mar. 31, 2011

Related U.S. Application Data

(63) Continuation of application No. PCT/IB2009/051053, filed on Mar. 13, 2009.

(30) Foreign Application Priority Data

Jul. 7, 2008    (FR) ..................................... 08/03830

(51) Int. Cl.
*H03K 17/00* (2006.01)
*H04B 3/30* (2006.01)
*H04L 25/02* (2006.01)

(52) U.S. Cl.
CPC .............. *H04B 3/30* (2013.01); *H04L 25/0272* (2013.01); *H04L 25/0292* (2013.01)
USPC .......................................................... 327/365

(58) Field of Classification Search
USPC ............................................. 327/63–82, 365
See application file for complete search history.

(56) References Cited

U.S. PATENT DOCUMENTS

| 6,195,395 | B1 | 2/2001 | Frodsham |
| 2006/0192429 | A1 | 8/2006 | Broyde et al. |
| 2008/0272840 | A1 | 11/2008 | Broyde et al. |
| 2009/0096487 | A1* | 4/2009 | Chi .................................. 327/51 |

FOREIGN PATENT DOCUMENTS

| FR | 2 852 467 | 9/2004 |
| FR | 2 896 360 | 7/2007 |

OTHER PUBLICATIONS

Nguyen et al., "Propagation Over Multiple Parallel Transmission Lines Via Modes," IBM Technical Disclosure Bulletin, vol. 31, No. 11, (Apr. 1990), pp. 1-06.

(Continued)

*Primary Examiner* — Sibin Chen
(74) *Attorney, Agent, or Firm* — Barnes & Thornburg LLP

(57) ABSTRACT

The invention relates to a receiving circuit for transmission through interconnections used for sending a plurality of electrical signals.
Each of the output signals of the receiving circuit produced by the receiving circuit of the invention is delivered by an output of a combining circuit having 4 inputs and 4 outputs. Each signal terminal of the receiving circuit is connected to a first input terminal of a differential circuit, the differential circuit also having a second input terminal and a single output terminal. The common terminal of the receiving circuit is connected to the second input terminal of each of the differential circuits. Each input of the combining circuit is coupled to the output terminal of one of the differential circuits. Each of the output signals of the receiving circuit is a linear combination of the voltages between one of the signal terminals and the common terminal.

19 Claims, 5 Drawing Sheets

(56) References Cited

OTHER PUBLICATIONS

Broyde et al., "A New Pseudo-Differential Transmission Scheme for On-Chip and On-Board Interconnection," Proceedings of the CEM 08 International Symposium on Electromagnetic Compatibility, (May 2008), pp.

Broyde et al., "A Simple Method for Transmission With Reduced Crosstalk and Echo," Electronics Circuits and Systems, (Dec. 2006), pp. 684-687.

International Search Report for International Application No. PCT/IB2009/051053, dated Jul. 6, 2009.

* cited by examiner

US 8,896,361 B2

PSEUDO-DIFFERENTIAL RECEIVING CIRCUIT

CROSS REFERENCE TO RELATED APPLICATIONS

This is a Continuation Application of PCT application PCT/IB2009/051053, filed 13 Mar. 2009, published in English under No. WO 2010/004442, which in turn claims priority to French patent application number 08/03830 filed 7 Jul. 2008 and entitled "Circuit de reception pseudo-différentiel", both of which are incorporated herein by reference.

FIELD OF THE INVENTION

The invention relates to a receiving circuit for pseudo-differential transmission through interconnections used for sending a plurality of electrical signals, such as the interconnections made with multiconductor cables, or with the traces of a printed circuit board, or inside an integrated circuit.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:
  the binary signals used in binary signaling, that is to say any signal such that, in each transmission channel, the set of the values that this signal may take on has 2 elements;
  the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits. Multilevel signals, for instance quaternary signals (sometimes referred to as PAM-4 or 4-PAM), are used to obtain high bit rates. We will consider that any signal which does not comply with this definition of a digital signal is an analog signal. Thus, the result of any type of modulation of a carrier by a digital signal will be regarded as an analog signal.

The French patent application number 07/05260 of 20 July 2007 entitled "Procédé et dispositif pour les transmissions pseudo-différentielles", corresponding to the international application number PCT/IB2008/052102 of 29 May 2008 (WO 2009/013644) entitled "Method and device for pseudo-differential transmission", describes a method for pseudo-differential transmission providing m transmission channels, where m is an integer greater than or equal to 2, through an interconnection having n transmission conductors and a return conductor distinct from the reference conductor, n being an integer greater than or equal to m, the interconnection being structurally combined with the reference conductor throughout the length of the interconnection. A device implementing this method is shown in FIG. 1, this device providing m=4 transmission channels using an interconnection (1) having n=4 transmission conductors (11) (12) (13) (14) and a return conductor (10) distinct from the reference conductor (7). In FIG. 1, the transmitting circuit (5) receives at its input the signals of the m=4 channels of the source (2), and its output terminals are connected to the transmission conductors (11) (12) (13) (14) of the interconnection (1). The receiving circuit (6) has its 5 input terminals connected to the conductors (10) (11) (12) (13) (14) of the interconnection (1) and delivers m=4 "output signals of the receiving circuit" to the destination (3). Thus, the analog or digital signals of the 4 channels of the source (2) are sent to the 4 channels of the destination (3). The interconnection used in FIG. 1 is such that, in a given frequency band, taking into account the lumped impedances seen by the interconnection and caused by the circuits connected to the interconnection elsewhere than at the ends of the interconnection, it can be modeled as a (n+1)-conductor multiconductor transmission line, said multiconductor transmission line having uniform electrical characteristics over its length, said multiconductor transmission line using the natural voltages referenced to the return conductor and the natural currents as variables. Consequently, it is possible to compute, for said multiconductor transmission line and said given frequency band, the characteristic impedance matrix with respect to the return conductor, denoted by $Z_{RC}$. The matrix $Z_{RC}$ is a matrix of size n×n.

The termination circuit (4) used in FIG. 1 is connected to the conductors of the interconnection (1), that is to say to the transmission conductors (11) (12) (13) (14) and the return conductor (10). According to the invention described in said French patent application number 07/05260 and the corresponding international application, the impedance matrix of the termination circuit with respect to the return conductor is, in a part of the frequency band used for transmission, approximately equal to a diagonal matrix of size n×n, denoted by $Z_{RL}$. The matrices $Z_{RC}$ and $Z_{RL}$ may be used to compute the matrix of the voltage reflection coefficients of said termination circuit with respect to the return conductor, denoted by $P_R$. The termination circuit (4) may for instance be proportioned such that all components of $P_R$ have an absolute value less than or equal to 2/10. The matrix $P_R$ is of course a matrix of size n×n.

The fact that, in FIG. 1, $Z_{RL}$ is a matrix of size n×n indicates that, in said given frequency band, the termination circuit (4) approximately behaves as if it was not connected to ground, hence as a floating (n+1)-terminal circuit element. The specialist understands that, consequently, in an ideal implementation, the termination circuit (4) does not have an impedance matrix with respect to the reference conductor (7). Additionally, the fact that $Z_{RL}$ is a diagonal matrix implies that the termination circuit (4) may consist of n passive linear two-terminal circuit elements, each of said passive linear two-terminal circuit elements being connected between the return conductor (10) and one and only one of said transmission conductors (11) (12) (13) (14).

A receiving circuit for pseudo-differential transmission through a plurality of transmission channels, shown in FIG. 2 for the case m=4, typically comprises:
  m signal terminals (101), a common terminal (100) and a reference terminal (ground), the signal terminals being intended to be connected to an interconnection having at least m transmission conductors, m being an integer greater than or equal to 2;
  m differential circuits (61) delivering m "output signals of the receiving circuit", each of said differential circuits (61) having a first input terminal connected to one and only one of said signal terminals (101), each of said differential circuits (61) having a second input terminal connected to said common terminal (100), each of said "output signals of the receiving circuit" being delivered by the output terminal (68) of one of said differential circuits (61), said each of said "output signals of the receiving circuit" being mainly determined by the voltage between said first input terminal of said one of said differential circuits (61) and said second input terminal of said one of said differential circuits (61).

Each differential circuit may for instance be a differential amplifier having a single output terminal, as in FIG. 2, or a differential output differential amplifier having two output terminals. Such differential circuits may be used for receiving analog or digital signals.

The receiving circuit for pseudo-differential transmission shown in FIG. 2 may for instance be used in the device for pseudo-differential transmission shown in FIG. 1. A similar receiving circuit for pseudo-differential transmission is for instance shown in FIG. 12 of said French patent application number 07/05260 and the corresponding international application, this receiving circuit for pseudo-differential transmission being such that each differential circuit comprises a differential pair, a current source and two resistors.

Some types of receiving circuit for pseudo-differential transmission are only intended to receive digital signals, for instance the receiving circuits for pseudo-differential transmission described in U.S. Pat. No. 5,994,925 entitled "Pseudo-differential logic receiver" and in U.S. Pat. No. 7,099,395 entitled "Reducing coupled noise in pseudo-differential signaling".

We note that, in said U.S. Pat. Nos. 5,994,925 and 7,099, 395, each of said second input terminals is connected to a common node instead of being connected to said common terminal, the voltage between said common node and ground being mainly determined by the voltage between said common terminal and ground. All said second input terminals may be connected to a single common node, but this is not always the case. Such a common node may for instance be the output of a bias generator, referred to as "bias" in FIG. 3A and FIG. 3B of said U.S. Pat. No. 5,994,925. In this case, the voltage between said common node and ground is not intended to be equal to the voltage between said common terminal and ground. Such a common node may for instance be the output of a unity gain amplifier, referred to as "$V_{BUF}$" in FIG. 5 of said U.S. Pat. No. 7,099,395. In this case, the voltage between said common node and ground is intended to be equal to the voltage between said common terminal and ground.

Pseudo-differential transmission is effective at reducing external crosstalk. In particular, the method of said French patent application number 07/05260 and of the corresponding international application is very effective for the suppression of all causes of external crosstalk. However, pseudo-differential transmission methods suffer from internal crosstalk. For instance, the article of F. Broydé and E. Clavelier entitled "A new pseudo-differential transmission scheme for on-chip and on-board interconnections" published in the proceedings of the "14$^{ème}$ colloque international sur la compatibilité électromagnétique—CEM 08", which took place in Paris, France in May 2008, shows that internal crosstalk is present in a device implementing the pseudo-differential transmission method disclosed in said French patent application number 07/05260 and in the corresponding international application. Other examples of internal crosstalk mechanisms occurring in pseudo-differential transmission are explained below, in the presentations of the first embodiment and of the second embodiment.

DESCRIPTION OF THE INVENTION

It is an object of the receiving circuit of the invention to receive electrical signals from an interconnection having two or more transmission conductors, the transmission presenting reduced external crosstalk and reduced internal crosstalk.

The invention is about a receiving circuit for transmitting signals through a plurality of transmission channels, in a known frequency band, comprising:

m signal terminals, a common terminal and a reference terminal (ground), the signal terminals being intended to be connected to an interconnection having at least m transmission conductors, m being an integer greater than or equal to 2;

m differential circuits, each of said differential circuits having a first input terminal coupled to one and only one of said signal terminals, each of said differential circuits having a second input terminal coupled to a common node, the voltage between said common node and the reference terminal being mainly determined by the voltage between said common terminal and the reference terminal, each of said differential circuits having an output, the output signal of each of said differential circuits being, for small signals in a part of said known frequency band, mainly determined by the voltage between the signal terminal coupled to said first input terminal of said each of said differential circuits and said common terminal; and a combining circuit delivering, when the combining circuit is in the activated state, p "output signals of the receiving circuit" corresponding each to a transmission channel, p being an integer greater than or equal to 2 and less than or equal to m, said output of each of said differential circuits being coupled to an input of the combining circuit, each of said "output signals of the receiving circuit" being mainly determined by said output signals of said differential circuits, one or more of said "output signals of the receiving circuit" being not mainly determined by only one of said output signals of said differential circuits.

In the receiving circuit of the invention, the common terminal is distinct from the reference terminal, because the voltage between the common terminal and the reference terminal is used to obtain the voltage between said common node and the reference terminal. The common terminal is used by the receiving circuit of the invention as a voltage-mode input, in such a way that the output signal of each of said differential circuits is substantially only determined by one and only one of the voltages between one of said signal terminals and said common terminal. Consequently, the common terminal is not connected to the reference terminal inside the receiving circuit of the invention, and the voltage between the common terminal and the reference terminal has little or no influence on said "output signals of the receiving circuit". However, this does not preclude a use of a receiving circuit of the invention wherein the common terminal of the receiving circuit of the invention is grounded (i.e. connected to the reference terminal) outside the receiving circuit of the invention.

According to the invention, each of said differential circuits has a second input terminal coupled to a common node, the voltage between said common node and the reference terminal being mainly determined by the voltage between said common terminal and the reference terminal. This must be interpreted in a broad sense, as: each of said differential circuits has a second input terminal coupled to a common node, the voltage between said common node and the reference terminal being mainly determined, at each point in time, by the history, up to said point in time, of the voltage between said common terminal and the reference terminal.

A receiving circuit of the invention may be such that said common node coupled to said second input terminal of one of said differential circuits is the same node for all said differential circuits, said common node being coupled to said common terminal, using a direct connection or an indirect coupling such as an alternating current (ac) coupling through a capacitor. However, a receiving circuit of the invention may also be such that said common node coupled to said second input terminal of one of said differential circuits is not the same node for all said differential circuits.

A receiving circuit of the invention may further comprise one or more common terminal circuits, each of said common terminal circuits having an input terminal coupled to said common terminal, each of said common terminal circuits having an output terminal delivering a voltage mainly determined by the voltage between said common terminal and the reference terminal. At least one of said common nodes may be coupled to said output terminal of each of said common terminal circuits. The output terminal of each of the common terminal circuits may be coupled to at least one of the common nodes. In the two previous sentences, the wording "at least one of said common nodes" obviously means "the common node" in the case where said common node coupled to said second input terminal of one of said differential circuits is the same node for all said differential circuits, or "at least one of the common nodes" in the case where said common node coupled to said second input terminal of one of said differential circuits is not the same node for all said differential circuits.

The specialist understands that one or more of said common terminal circuits may for instance be a bias generator similar to the one used in said U.S. Pat. No. 5,994,925, as explained above. The specialist understands that said output terminal of one or more of said common terminal circuits may, for small signals in said part of said known frequency band, deliver a voltage substantially equal to the voltage between said common terminal and the reference terminal. In particular, one or more of said common terminal circuits may for instance be a unity gain amplifier.

The specialist understands that, in the case where the voltages between each of said common nodes and said common terminal are, for small signals in said part of said known frequency band, substantially equal to the voltage between said common terminal and the reference terminal, the output signal of each of said differential circuits could be, for small signals in said part of said known frequency band, mainly determined by the voltage between said first input terminal of said each of said differential circuits and said second input terminal of said each of said differential circuits.

According to the invention, the output signal of each of said differential circuits is, for small signals in said part of said known frequency band, mainly determined by the voltage between the signal terminal coupled to said first input terminal of said each of said differential circuits and the common terminal. This must be interpreted in a broad sense, as: the output signal of each of said differential circuits is, for small signals in said part of said known frequency band, mainly determined, at each point in time, by the history, up to said point in time, of the voltage between the signal terminal coupled to said first input terminal of said each of said differential circuits and the common terminal.

As a first example, each of said differential circuits used in a receiving circuit of the invention may be a differential amplifier, such that, in a specified frequency band, the output voltage of said differential amplifier is proportional to the voltage between the positive input terminal of said differential amplifier and the negative input terminal of said differential amplifier. Such a differential amplifier may have a single output terminal or a differential output using two output terminals. As a second example, each differential circuit used in a receiving circuit of the invention may be a differential transconductance amplifier, such that, in a specified frequency band, the output current of said differential transconductance amplifier is the product of a given transconductance and the voltage between the positive input terminal of said differential transconductance amplifier and the negative input terminal of said differential transconductance amplifier. Such a differential transconductance amplifier may have a single output terminal or a differential output using two output terminals. As a third example, each differential circuit used in a receiving circuit of the invention may consist of a differential pair and biasing circuits, as shown in said FIG. 12 of said French patent application number 07/05260 and the corresponding international application.

We note that each of said differential circuits may also use more than two input terminals to obtain that the output signal of said each of said differential circuits is, for small signals in said part of said known frequency band, mainly determined by the voltage between the signal terminal coupled to said first input terminal of said each of said differential circuits and said common terminal. For instance, differential circuits having three input terminals, two of which being connected to different common nodes, are used in FIG. 7 of said U.S. Pat. No. 7,099,395.

In the following, the wordings "is in the deactivated state" and "is not in the activated state" are equivalent. According to the invention, said combining circuit delivers "output signals of the receiving circuit" corresponding each to a transmission channel, when the combining circuit is in the activated state. According to the invention, it is possible that there is a deactivated state of the combining circuit, in which the behavior of the combining circuit is different. However, the existence of a deactivated state of the combining circuit is not at all a characteristic of the invention.

According to the invention, the "output signals of the receiving circuit" may be analog signals or digital signals.

According to the invention, each of said "output signals of the receiving circuit" is mainly determined by said output signals of said differential circuits, one or more of said "output signals of the receiving circuit" being not mainly determined by only one of said output signals of said differential circuits. This must be interpreted in a broad sense, as: each of said "output signals of the receiving circuit" is mainly determined, at each point in time, by the history, up to said point in time, of said output signals of said differential circuits, one or more of said "output signals of the receiving circuit" being not mainly determined by the history, up to said point in time, of only one of said output signals of said differential circuits.

Consequently, a linear combination of elements $x_1, \ldots, x_r$ being a sum $\lambda_1 x_1 + \ldots + \lambda_r x_r$ where $\lambda_1, \ldots, \lambda_r$ are the coefficients of the linear combination, the specialist understands that, according to the invention, each of said "output signals of the receiving circuit" may be mainly determined by a linear combination of "filtered output signals of said differential circuits", each of said "filtered output signals of said differential circuits" being the result of the application of linear filtering to the output signal of one of said differential circuits, at least one of said linear combinations being such that two or more of the coefficients of said at least one of said linear combinations are not equal to zero.

Each of said "filtered output signals of said differential circuits" may be substantially equal to the output signal of the corresponding differential circuit. Consequently, according to the invention, each of said "output signals of the receiving circuit" may be mainly determined by a linear combination of said output signals of said differential circuits, at least one of said linear combinations being such that two or more of the coefficients of said at least one of said linear combinations are not equal to zero.

The coefficients of said linear combinations may be frequency-dependent complex numbers. However, the coefficients of said linear combinations may also be real numbers and/or frequency-independent numbers. The specialist understands that there are many possible designs for a combining circuit providing such linear combinations, such designs being based on linear combinations performed in analog circuits and/or in digital circuits.

According to the invention, said combining circuit may be a multiple-input and multiple-output amplifier having m inputs and p outputs. For instance, said multiple-input and multiple-output amplifier may be similar to one of the receiving circuits described in French patent number 0300064 of 6 Jan. 2003 entitled "Procédé et dispositif pour la transmission avec une faible diaphonie", corresponding to the international application number PCT/EP2003/015036 of 24 Dec. 2003 (WO 2004/062129), entitled "Method and device for transmission with reduced crosstalk", for instance one of the receiving circuits used in FIG. 7 or FIG. 9 of this French patent or this international application. For instance, said multiple-input and multiple-output amplifier may be similar to the multiple-input and multiple-output amplifier disclosed in French patent application no. 06/00388 of 17 Jan. 2006 entitled "Amplificateur à entrées multiples et sorties multiples" and in the corresponding international application no. PCT/IB2006/003950 of 19 Dec. 2006 (WO 2007/083191), entitled "multiple-input and multiple-output amplifier".

If said multiple-input and multiple-output amplifier receives voltages at its inputs and delivers voltages at its outputs, it is characterized by a gain matrix, and the specialist understands that such a gain matrix may be adjustable by electrical means. If said multiple-input and multiple-output amplifier receives voltages at its inputs and delivers currents at its outputs, it is characterized by a transfer admittance matrix, and the specialist understands that such a transfer admittance matrix may be adjustable by electrical means. Consequently, according to the invention, said combining circuit may be such that at least one of said coefficients of said linear combinations can be adjusted by electrical means.

However, said combining circuit used in a device of the invention does not necessarily use analog signal processing to produce said "output signals of the receiving circuit". The combining circuit used in a device of the invention may be a multiple-input device using digital signal processing having m analog inputs. For instance, said multiple-input device using digital signal processing may be similar to one of the receiving circuits described in French patent number 0302814 of 6 Mar. 2003 entitled "Procédé et dispositif numériques pour la transmission avec une faible diaphonie", corresponding to the international application number PCT/EP2004/002382 of 18 Feb. 2004 (WO 2004/079941), entitled "Digital method and device for transmission with reduced crosstalk", for instance one of the receiving circuits shown in FIG. 3 or FIG. 5 of this French patent or this international application.

If the combining circuit is a multiple-input device using digital signal processing, it is also possible that at least one of said coefficients of said linear combinations can be adjusted by electrical means, for instance using storage in a memory.

Said interconnection having at least m transmission conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit.

The number m of signal terminals may be equal to the number p of "output signals of the receiving circuit". In particular, m may be greater than or equal to three.

According to the invention, the p "output signals of the receiving circuit" may for instance be delivered using p single-ended links. According to the invention, the p "output signals of the receiving circuit" may for instance be delivered using p differential links.

According to the invention, said differential circuits and/or said combining circuit may have a filtering function, for instance for the purpose of obtaining a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as the distortions caused by propagation. The reduction of these distortions may be obtained, in a device of the invention, using an equalization reducing the effects of the distortions caused by propagation, said equalization being implemented in said differential circuits and/or in said combining circuit. This type of processing, which is also sometimes referred to as compensation, is well known to specialists, and may be implemented using analog signal processing and/or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment (best mode).

Figure 3:
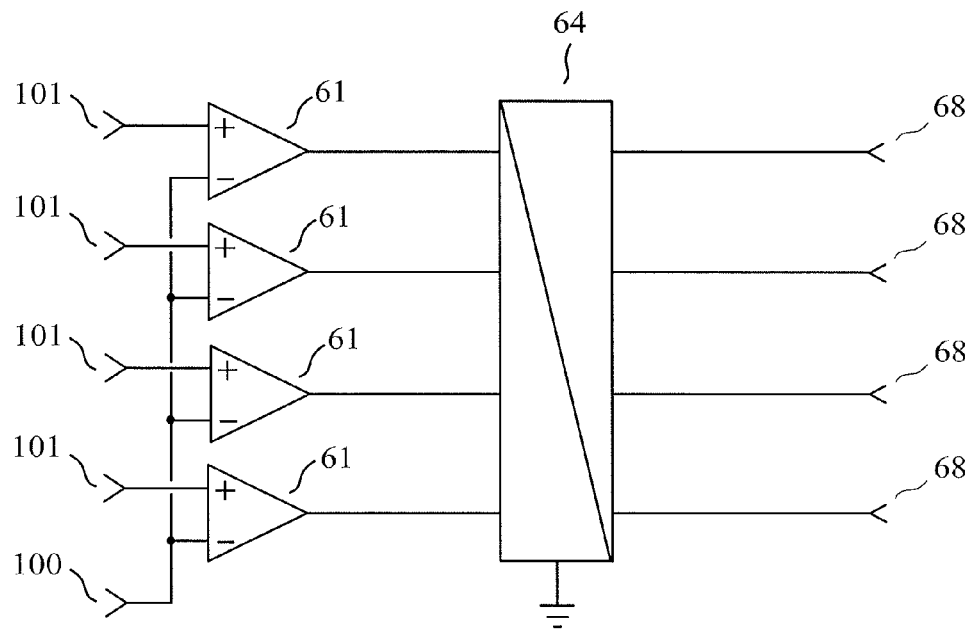
FIG. 3 shows a first embodiment of the invention.

As a first embodiment of a receiving circuit of the invention, given by way of non-limiting example and best mode of carrying out the invention, we have represented in FIG. 3 a receiving circuit of the invention built inside an integrated circuit, comprising m=4 signal terminals (101) and a common terminal (100), the signal terminals (101) and the common terminal (100) being intended to be connected to an interconnection having m=4 transmission conductors.

The receiving circuit shown in FIG. 3 is such that:
each of the p=4 "output signals of the receiving circuit" is delivered to an output (68) which is a single-ended output;
each of the p outputs (68) corresponds to an output of a combining circuit (64) having m inputs and p outputs;
each of the m=4 signal terminals (101) is connected to a first input terminal of a differential circuits (61), said differential circuit also having a second input terminal and a single output terminal;
the common terminal (100) corresponds to a common node and is connected to the second input terminal of each of said differential circuits (61);
each input of said combining circuit (64) is coupled to the output terminal of one of said differential circuits (61), the output signal of each of said differential circuits (61) being the voltage between the output terminal of said each of said differential circuits and ground, the output signal of each of said differential circuits being proportional to the voltage between the signal terminal (101) coupled to the first input terminal of said each of said differential circuits and the common terminal (100).

In this embodiment, each differential circuit (61) is a wideband differential amplifier. The combining circuit (64) is a multiple-input and multiple-output amplifier having m inputs and p outputs, each output voltage of the multiple-input and multiple-output amplifier being a linear combination of its input voltages such that two or more of the coefficients of said linear combination are not equal to zero. We note that, in this embodiment, each of said "output signals of the receiving circuit" is a linear combination of the voltages between one of said signal terminals (101) and said common terminal (100).

Said output voltages of the multiple-input and multiple-output amplifier are voltages with respect to ground. Consequently, in FIG. 3, a terminal of the combining circuit (64) is connected to ground. Let us note that the ground symbol used in FIG. 3 (and also in the FIGS. 5 and 6 discussed later) has exactly the same meaning as the other ground symbol used in some of the other accompanying drawings (the FIGS. 1 and 4).

Figure 1:
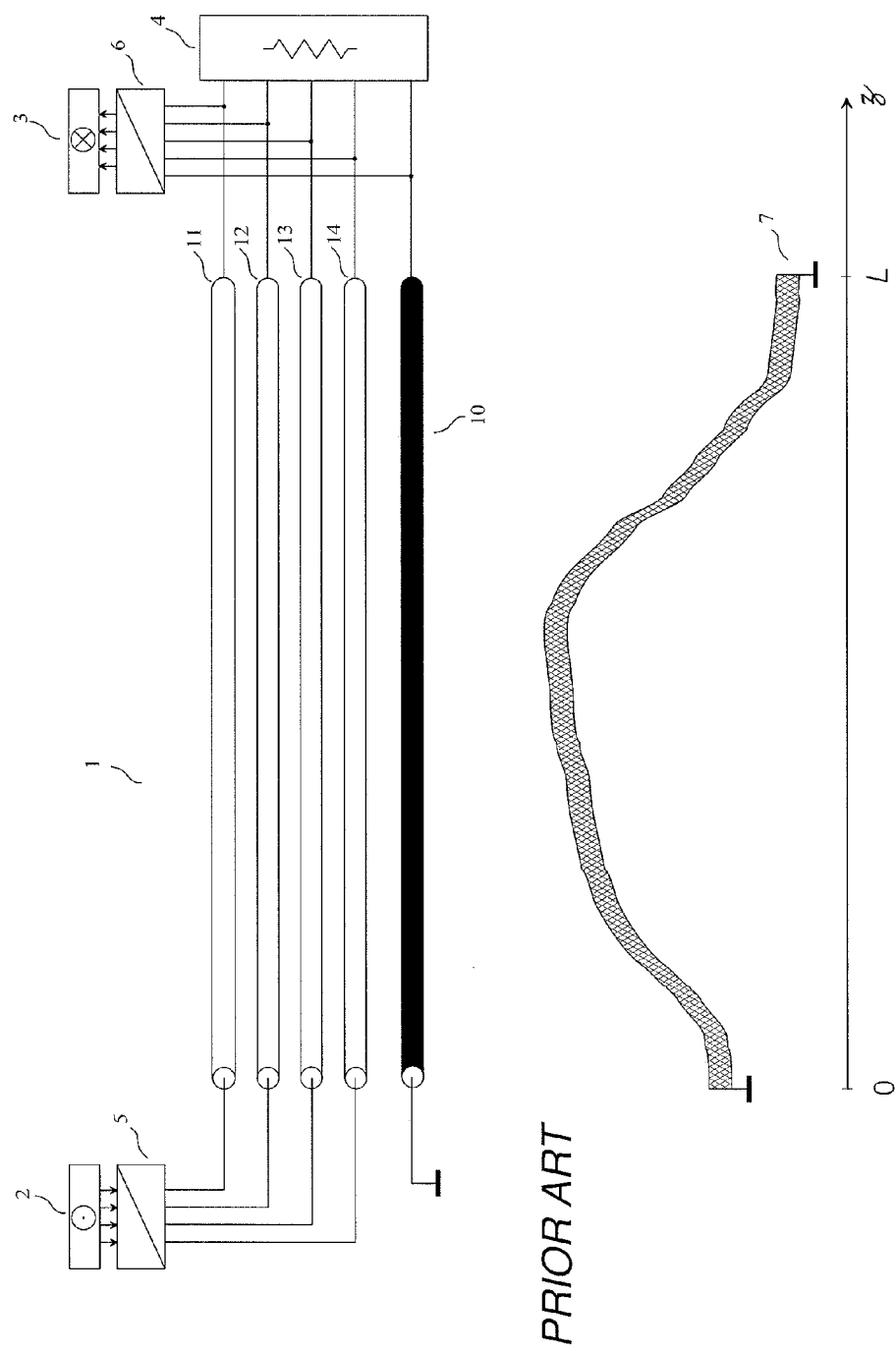
FIG. 1 shows a pseudo-differential system for transmission comprising an interconnection having four transmission conductors, and has already been discussed in the section dedicated to the presentation of prior art.

Let us now consider a device for pseudo-differential transmission defined in said French patent application number 07/05260 and the corresponding international application, shown in FIG. 1, such that the transmission variables produced by the transmitting circuit (5) are natural voltages referenced to the return conductor. This device for pseudo-differential transmission uses a receiving circuit such as the one shown in FIG. 2. At low frequencies, this device for pseudo-differential transmission suffers from internal crosstalk because of the non-zero resistance of the return conductor (this problem may for instance occur when the interconnection is built inside an integrated circuit).

Figure 2:
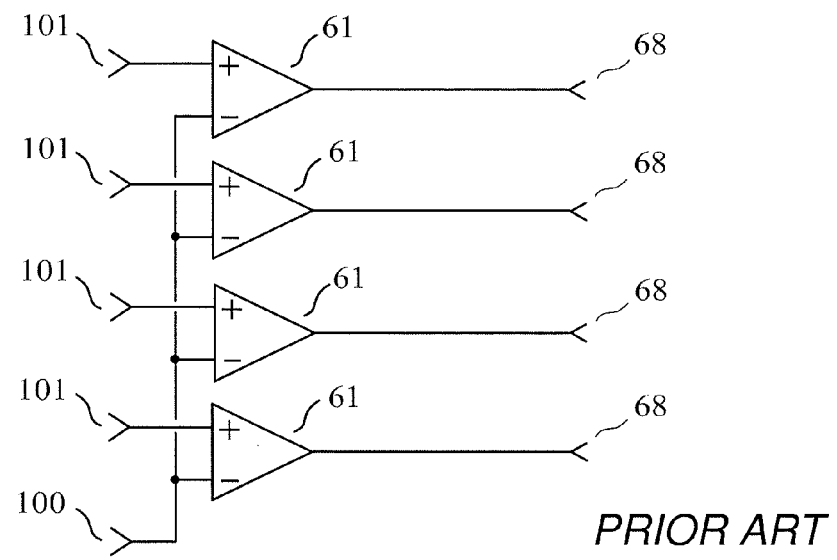
FIG. 2 shows a pseudo-differential receiving circuit, and has already been discussed in the section dedicated to the presentation of prior art.

In order to solve this problem, the receiving circuit of the invention shown in FIG. 3 may for instance be used in the place of a receiving circuit such as the one shown in FIG. 2. At low frequencies, let us for instance assume that the resistance of each of the transmission conductors (11) (12) (13) (14) is $r_T$ and that the resistance of the return conductor (10) is $r_R$. Let us also assume that each termination circuit (4) is made of a network of n=4 resistors of resistance R, each of said resistors being connected between one of said transmission conductors and said return conductor, each of said resistors being connected to a different transmission conductor. The multiple-input and multiple-output amplifier may be designed in such a way that its gain matrix is given by $$G = \begin{pmatrix} g_A & g_B & g_B & g_B \\ g_B & g_A & g_B & g_B \\ g_B & g_B & g_A & g_B \\ g_B & g_B & g_B & g_A \end{pmatrix} \quad (1)$$

where $g_A = \dfrac{h_A + (n-2)h_B}{h_A^2 + (n-1)(h_A h_B - h_B^2) - h_A h_B} \quad (2)$ and $g_A = \dfrac{-h_B}{h_A^2 + (n-1)(h_A h_B - h_B^2) - h_A h_B} \quad (3)$ where $h_A = \left(1 - \dfrac{r_R}{R + r_T + nr_R}\right)\dfrac{R}{R + r_T} \quad (4)$ and $h_B = \dfrac{-r_R}{R + r_T + nr_R}\dfrac{R}{R + r_T} \quad (5)$ It is possible to show that this gain matrix eliminates the internal crosstalk between the transmission channels, produced at low frequencies by the resistance of the return conductor of the interconnection used in this pseudo-differential link.

This first embodiment is such that the "output signals of the receiving circuit" may be analog or digital signals.

Second Embodiment

Figure 4:
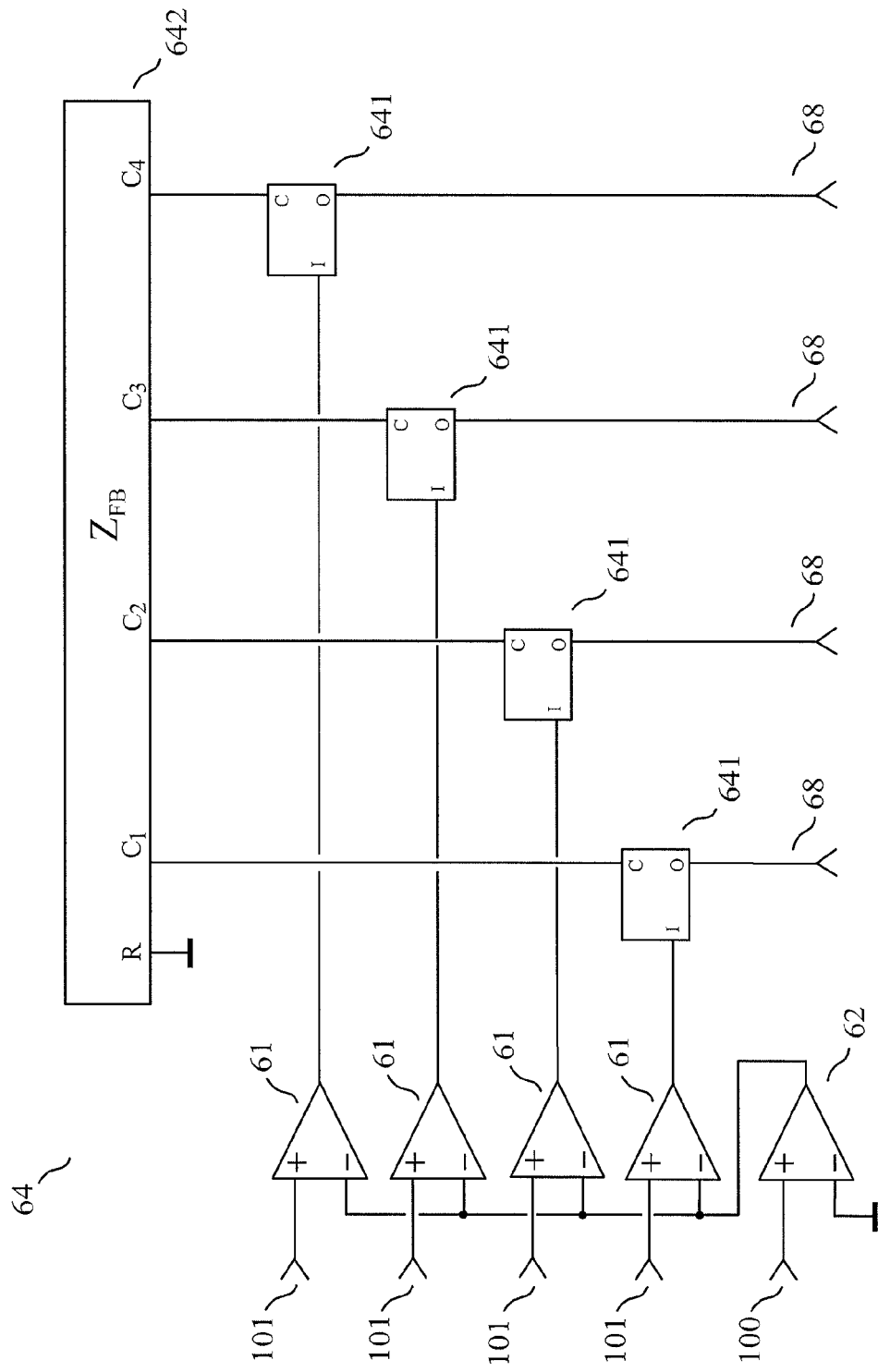
FIG. 4 shows a second embodiment of the invention.

As a second embodiment of a receiving circuit of the invention, given by way of non-limiting example, we have represented in FIG. 4 a receiving circuit of the invention built inside an integrated circuit, comprising m=4 signal terminals (101) and a common terminal (100), the signal terminals (101) and the common terminal (100) being intended to be connected to an interconnection having m=4 transmission conductors. The receiving circuit shown in FIG. 4 is such that:
each of the p=4 "output signals of the receiving circuit" is delivered to an output (68) which is a single-ended output;
each of the p outputs (68) corresponds to an output of a combining circuit (64) comprising p active sub-circuits (641) and a feedback network (642), said combining circuit (64) having m inputs and p outputs;
each of the m=4 signal terminals (101) is connected to a first input terminal of a differential circuits (61), said differential circuit also having a second input terminal and a single output terminal;
the common terminal (100) is connected to the input of a common terminal circuit made of a unity gain amplifier (62), the output of said common terminal circuit corresponding to a common node to which the second input terminal of each of said differential circuits (61) is connected;
each input of said combining circuit (64) is coupled to the output terminal of one of said differential circuits (61), the output signal of each of said differential circuits (61) being the voltage between the output terminal of said each of said differential circuits and ground, the output signal of each of said differential circuits being proportional to the voltage between the signal terminal (101) coupled to the first input terminal of said each of said differential circuits and the common terminal (100).

In this embodiment, each differential circuit (61) is a wideband differential amplifier. Said combining circuit (64) is a multiple-input and multiple-output series-series feedback amplifier (MIMO-SSFA) disclosed in said French patent application no. 06/00388 and the corresponding international application. More details on the MIMO-SSFA may also be found in the article of F. Broydé and E. Clavelier entitled "MIMO Series-Series Feedback Amplifiers", published in the journal *IEEE Transactions on Circuits and Systems II*, vol. 54, No. 12, pages 1037 to 1041, in December 2007. This multiple-input and multiple-output amplifier is such that each output current of the multiple-input and multiple-output amplifier is a linear combination of its input voltages, the coefficients of the linear combinations having the dimensions of admittance and being such that two or more of the coefficients of each of said linear combinations are not equal to zero.

It should be noted that this second embodiment is not appropriate for the use considered for the first embodiment, because, according to the equations (2) to (5), the product $g_A g_B$ is positive, for the values of R, $r_T$ and $r_R$ such that $R \gg r_T \geq r_R$ of a typical configuration.

Let us now consider a device for pseudo-differential transmission such as the one shown in FIG. 1, such that the termination circuit (4) does not produce any current (equivalently, the termination circuit is not present) and such that the transmission variables produced by the transmitting circuit (5) are voltages between each transmission conductor and ground, each output of the transmitting circuit presenting an internal resistance $r_s$. This device for pseudo-differential transmission uses a receiving circuit such as the one shown in FIG. 2. If we assume that the resistance of each conductor of the interconnection is very small, this device for pseudo-differential transmission does not suffer from internal crosstalk at low frequencies. At higher frequencies however, this device for pseudo-differential transmission suffers from internal crosstalk because of the mutual capacitances between the conductors of the interconnection.

In order to solve this problem, the receiving circuit of the invention shown in FIG. 4 may for instance be used in the place of a receiving circuit such as the one shown in FIG. 2. It can be shown that, using the formulas provided in said article entitled "MIMO Series-Series Feedback Amplifiers", the MIMO-SSFA of FIG. 4 may be proportioned such that the transmission losses and the internal crosstalk due to mutual capacitances are effectively reduced. Using a particular interconnection, we for instance obtained a tenfold increase in bandwidth and a reduction of internal crosstalk of about 15 dB, using a feedback network (642) only made of 4 resistors and 7 capacitors. We note that this feedback network is such that the coefficients of said linear combinations are frequency-dependent and are non-real complex numbers at a non-zero frequency.

This second embodiment is such that the "output signals of the receiving circuit" may be analog or digital signals.

Third Embodiment

Figure 5:
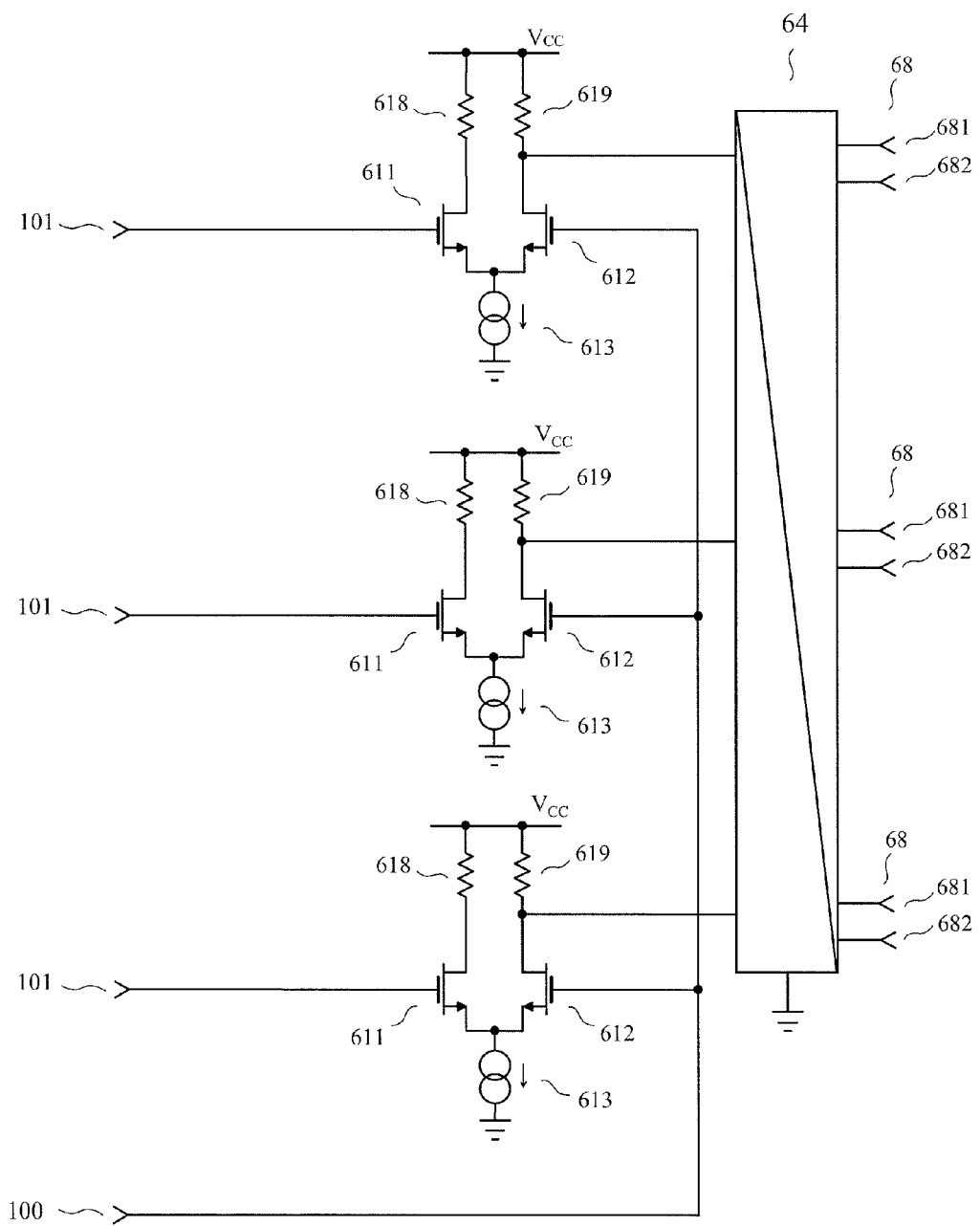
FIG. 5 shows a third embodiment of the invention.

As a third embodiment of a receiving circuit of the invention, given by way of non-limiting example, we have represented in FIG. 5 a receiving circuit of the invention, comprising m=3 signal terminals (101) and a common terminal (100), the signal terminals (101) and the common terminal (100) being intended to be connected to an interconnection having m=3 transmission conductors. The receiving circuit shown in FIG. 5 is such that:

each of the p=3 "output signals of the receiving circuit" is delivered to an output (68) which is a differential output comprising 2 terminals (681) (682);

each of the p outputs (68) corresponds to an output of a combining circuit (64) having m inputs and p outputs;

each input of said combining circuit (64) corresponds to the output of a differential circuit comprising a differential pair made of two transistors (611) (612), a current source (613) and two resistors (618) (619);

each of the m=3 signal terminals (101) is connected to the gate of the first transistor (611) of one of said differential pairs;

the common terminal (100) corresponds to a common node and is connected to the gates of the p second transistors (612) of said differential pairs.

The specialist understands that the current sources (613) shown in FIG. 5 are ideal circuit elements which may be realized with real components, for instance using current mirrors. The differential circuits defined in this third embodiment have a very wide bandwidth, but they are linear only over a limited range of voltage between one of the signal terminals (101) and the common terminal (100). We may nevertheless say that the output signal of each differential circuit is, for small signals in a part of the frequency band used for transmission, mainly determined by the voltage between the signal terminal coupled to the first input terminal of said differential circuit and the common terminal. We note that the linearity of such a differential circuit may be improved without reduction in bandwidth, using one of the techniques presented in the chapter 5 of the book of C. Toumazou, F. J. Lidgey and D. G. Haigh entitled *Analogue IC design: the current-mode approach* and published by Peter Peregrinus Ltd. in 1990.

In this third embodiment, the combining circuit (64) outputs binary digital signals, the combining circuit (64) comprising p differential output comparators and a multiple-input and multiple-output amplifier having m inputs and p outputs, each input of the combining circuit (64) being an input of said multiple-input and multiple-output amplifier, each output of said multiple-input and multiple-output amplifier being connected to an input of one of said differential output comparators, each output of the combining circuit (64) being the differential output of one of said differential output comparators.

Fourth Embodiment

Figure 6:
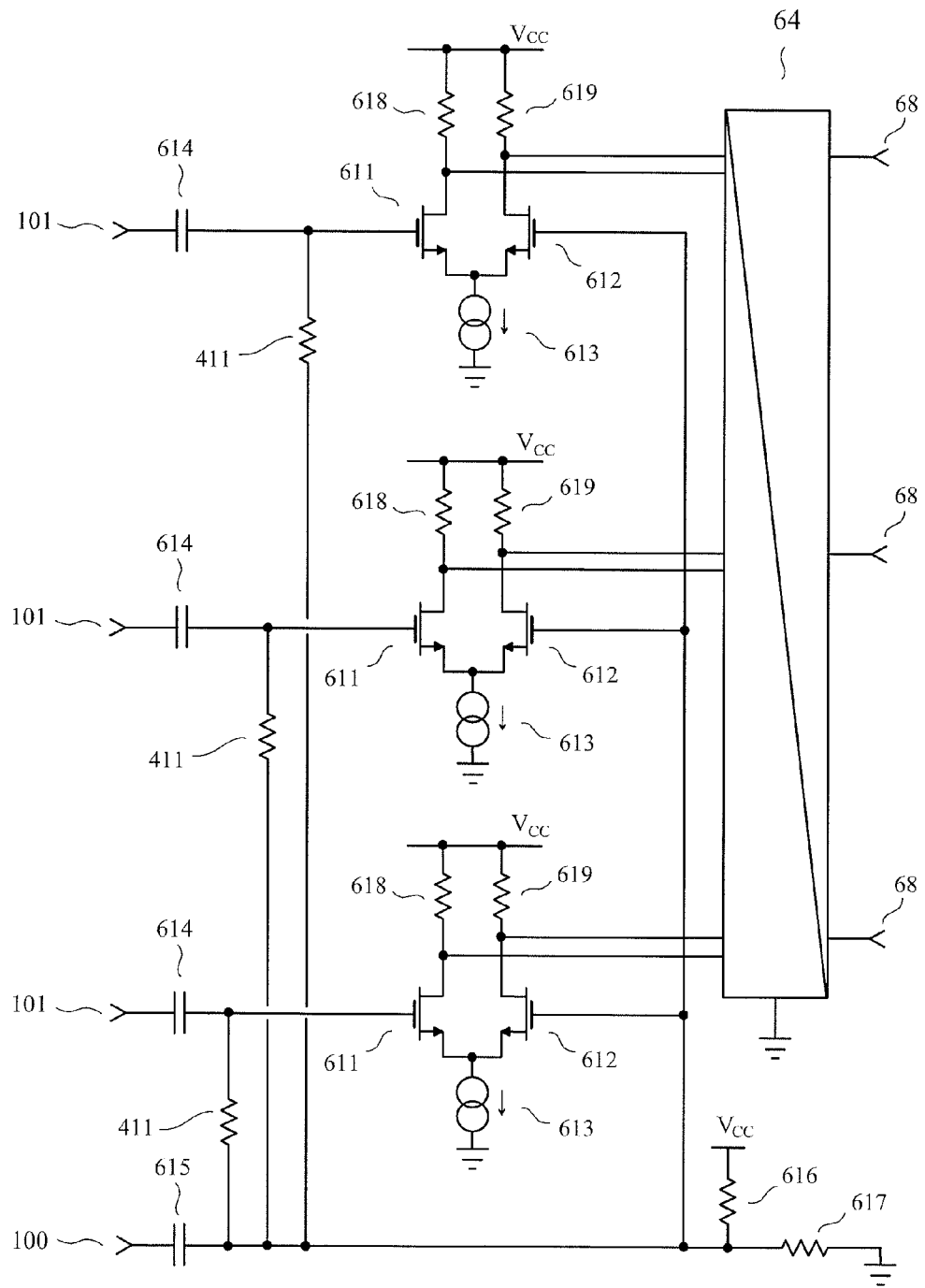
FIG. 6 shows a fourth embodiment of the invention.

As a fourth embodiment of a receiving circuit of the invention, given by way of non-limiting example, we have represented in FIG. 6 a receiving circuit of the invention, comprising m=3 signal terminals (101) and a common terminal (100), the signal terminals (101) and the common terminal (100) being intended to be connected to an interconnection having m=3 transmission conductors. The receiving circuit shown in FIG. 6 is such that:

each of the p=3 "output signals of the receiving circuit" is delivered to an output (68) which is a single-ended output;

each of the p outputs (68) corresponds to an output of a combining circuit (64) having m inputs and p outputs;

each input of said combining circuit (64) corresponds to the differential output of a differential circuit comprising a differential pair made of two transistors (611) (612), a current source (613) and two resistors (618) (619);

each of the m=3 signal terminals (101) is connected to the first terminal of a capacitor (614) whose second terminal is connected to the gate of the first transistor (611) of one of said differential pairs;

the common terminal (100) is connected to the first terminal of a capacitor (615) whose second terminal corresponds to a common node and is connected to the gate of the p second transistors (612) of said differential pairs;

said differential pairs are biased by a resistor (616) connected between a node at a power supply voltage and the gate of the p second transistors (612) of said differential pairs, a resistor (617) connected between the reference terminal (ground) and the gate of the p second transistors (612) of said differential pairs, and resistors (411) each connected between the gates of the transistors (611) (612) of one of said differential pairs.

The capacitors (614) (615) providing an alternating current (ac) coupling, this fourth embodiment is appropriate for receiving signals without intended direct current component. The resistors (411) connected between the gates of the transistors (611) (612) of one of said differential pairs may have a value above 10 kΩ, in which case they do not form a termination circuit.

In this fourth embodiment, the combining circuit (64) is a multiple-input device using digital signal processing having m inputs and p outputs. Said multiple-input device using digital signal processing is similar to the receiving circuit shown in FIG. 3 of said French patents number 0302814 and of the corresponding international application.

When the combining circuit (64) is not in the activated state, its output presents a high impedance, so that the combining circuit (64) does not deliver any of the "output signals of the receiving circuit". The specialists know several methods for producing a high impedance state at the output of the combining circuit (64). We note that the circuits and the address and/or control lines needed to control the activated state of the combining circuit (64) at a given point in time are not shown in FIG. 6.

This receiving circuit is such that each of said "output signals of the receiving circuit" is a digital signal available at one of the outputs (68). Alternatively, each of said "output signals of the receiving circuit" could be delivered by a parallel interface using several output terminals. Alternatively, all "output signals of the receiving circuit" could share the same serial or parallel interface, each of said "output signals of the receiving circuit" corresponding to a logical transmission channel created in this interface.

Indications On Industrial Applications

The receiving circuit of the invention is suitable for pseudo-differential transmission between integrated circuits through an interconnection having two or more transmission conductors, the transmission presenting reduced unwanted couplings.

We note that, in the embodiments of a receiving circuit of the invention, given above by way of non-limiting examples and shown in FIGS. 5 and 6, the active components are MOSFETs. This is not at all a characteristic of the invention, and specialists understand that it would have also been possible to use bipolar transistors or other types of active components. Consequently, the receiving circuit of the invention may be implemented in integrated circuits made using any applicable manufacturing process.

The invention is suitable for the protection against the noise produced by unwanted electromagnetic couplings in printed circuit boards. The invention is particularly beneficial to printed circuit assemblies comprising wide-band analog circuits or fast digital circuits. For receiving p transmission channels, the invention has the advantage of only requiring p+1 pins on an integrated circuit providing the function of the receiving circuit, as opposed to 2p pins in the case of a receiver for differential transmission.

The receiving circuit of the invention is particularly suitable for pseudo-differential transmission inside an integrated circuit, because it provides a good protection against the noise related to the currents flowing in the reference conductor and in the substrate of the integrated circuit.

A receiving circuit of the invention may be built inside an integrated circuit, but this is not at all a characteristic of the invention.

The invention is suitable for an implementation in a data bus architecture.

The invention is particularly suitable for multilevel signaling, because this type of transmission scheme is more sensitive to noise than binary signaling.

The invention is particularly suitable for simultaneous bi-directional signaling, because this type of transmission scheme is more sensitive to noise than unidirectional signaling.

The invention claimed is:

1. A receiving circuit for signal transmission through p transmission channels in a known frequency band, p being an integer greater than or equal to 2, comprising:

m signal terminals, a common terminal and a reference terminal, the signal terminals being intended to be connected to an interconnection having at least m transmission conductors, m being an integer greater than or equal to p;

m differential circuits, each of the differential circuits having a first input terminal coupled to one and only one of the signal terminals, each of the differential circuits having a second input terminal coupled to a common node, the voltage between the common node and the reference terminal being mainly determined by the voltage between the common terminal and the reference terminal, each of the differential circuits having an output, the output signal of each of the differential circuits being mainly determined by the voltage between the signal terminal coupled to the first input terminal of said each of the differential circuits and the common terminal; and a combining circuit delivering, when the combining circuit is in the activated state, p output signals of the receiving circuit corresponding each to one of said p transmission channels, the output of each of the differential circuits being coupled to an input of the combining circuit, each of the output signals of the receiving circuit being mainly determined by a linear combination of the output signals of the differential circuits, at least one of the linear combinations being such that two or more coefficients of said at least one of the linear combinations are not equal to zero.

2. The receiving circuit of claim 1, wherein said common node coupled to the second input terminal of one of the differential circuits is the same node for all said differential circuits, said common node being coupled to the common terminal.

3. The receiving circuit of claim 1, wherein said common node coupled to the second input terminal of one of the differential circuits is not the same node for all said differential circuits.

4. The receiving circuit of claim 1, further comprising one or more common terminal circuits, each of the common terminal circuits having an input terminal coupled to the common terminal, each of the common terminal circuits having an output terminal delivering a voltage mainly determined by the voltage between the common terminal and the reference terminal the output terminal of each of the common terminal circuits being coupled to at least one of the common nodes.

5. The receiving circuit of claim 4, wherein the output terminal of one or more of the common terminal circuits delivers, for small signals in said part of the known frequency band, a voltage substantially equal to the voltage between the common terminal and the reference terminal.

6. The receiving circuit of claim 1, wherein the combining circuit is such that at least one coefficient of said linear combinations can be adjusted by electrical means.

7. The receiving circuit of claim 1, wherein each of the output signals of the receiving circuit is a linear combination of the voltages between one of the signal terminals and the common terminal.

8. The receiving circuit of claim 1, wherein the receiving circuit constitutes a part of an integrated circuit, the interconnection being realized inside the integrated circuit.

9. The receiving circuit of claim 1, wherein the receiving circuit constitutes a part of an integrated circuit, each of the m signal terminals being coupled to one or more pins of the integrated circuit, the common terminal being coupled to one or more pins of the integrated circuit.

10. A receiving circuit for signal transmission through p transmission channels in a known frequency band, p being an integer greater than or equal to 2, comprising:
  m signal terminals, a common terminal and a reference terminal, the signal terminals being intended to be connected to an interconnection having at least m transmission conductors, m being an integer greater than or equal to p;
  m differential circuits, each of the differential circuits having a first input terminal coupled to one and only one of the signal terminals, each of the differential circuits having a second input terminal coupled to a common node, the voltage between the common node and the reference terminal being mainly determined by the voltage between the common terminal and the reference terminal, each of the differential circuits having an output, the output signal of each of the differential circuits being, for small signals in a part of the known frequency band, proportional to the voltage between the signal terminal coupled to the first input terminal of said each of the differential circuits and the common terminal; and
  a combining circuit delivering, when the combining circuit is in the activated state, p output signals of the receiving circuit corresponding each to one of said p transmission channels, the output of each of the differential circuits being coupled to an input of the combining circuit, each of the output signals of the receiving circuit being mainly determined by a linear combination of the output signals of the differential circuits, at least one of the linear combinations being such that two or more coefficients of said at least one of the linear combinations are not equal to zero.

11. The receiving circuit of claim 10, wherein said common node coupled to the second input terminal of one of the differential circuits is the same node for all said differential circuits.

12. The receiving circuit of claim 11, wherein said common node is coupled to the common terminal.

13. The receiving circuit of claim 10, wherein said common node coupled to the second input terminal of one of the differential circuits is not the same node for all said differential circuits.

14. The receiving circuit of claim 10, further comprising one or more common terminal circuits, each of the common terminal circuits having an input terminal coupled to the common terminal, each of the common terminal circuits having an output terminal delivering a voltage mainly determined by the voltage between the common terminal and the reference terminal, the output terminal of each of the common terminal circuits being coupled to at least one of the common nodes.

15. The receiving circuit of claim 14, wherein the output terminal of one or more of the common terminal circuits delivers, for small signals in said part of the known frequency band, a voltage substantially equal to the voltage between the common terminal and the reference terminal.

16. The receiving circuit of claim 10, wherein the combining circuit is such that at least one coefficient of said linear combinations can be adjusted by electrical means.

17. The receiving circuit of claim 10, wherein each of the output signals of the receiving circuit is a linear combination of the voltages between one of the signal terminals and the common terminal.

18. The receiving circuit of claim 10, wherein the receiving circuit constitutes a part of an integrated circuit, the interconnection being realized inside the integrated circuit.

19. The receiving circuit of claim 10, wherein the receiving circuit constitutes a part of an integrated circuit, each of the m signal terminals being coupled to one or more pins of the integrated circuit, the common terminal being coupled to one or more pins of the integrated circuit.

* * * * *